(12) United States Patent
Nisinosono et al.

(10) Patent No.: US 8,714,179 B2
(45) Date of Patent: May 6, 2014

(54) SOLENOID VALVE

(75) Inventors: Hiroyuki Nisinosono, Tokyo (JP); Yoshinari Kasagi, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 722 days.

(21) Appl. No.: 13/060,473

(22) PCT Filed: Aug. 26, 2009

(86) PCT No.: PCT/JP2009/064843
§ 371 (c)(1),
(2), (4) Date: Feb. 24, 2011

(87) PCT Pub. No.: WO2010/024280
PCT Pub. Date: Mar. 4, 2010

(65) Prior Publication Data
US 2011/0147630 A1   Jun. 23, 2011

(30) Foreign Application Priority Data
Aug. 27, 2008   (JP) .................................. 2008-217899

(51) Int. Cl.
*F16K 31/02* (2006.01)
(52) U.S. Cl.
USPC ................... 137/15.18; 251/129.15; 251/366
(58) Field of Classification Search
USPC .......... 137/15.18, 15.21, 596.17; 251/129.15, 251/366–367
See application file for complete search history.

(56) References Cited

U.S. PATENT DOCUMENTS

| | | | | |
|---|---|---|---|---|
| 4,753,416 A | * | 6/1988 | Inagaki et al. | ........... 251/129.15 |
| 6,321,767 B1 | * | 11/2001 | Seid et al. | .................. 137/15.21 |
| 6,732,999 B2 | * | 5/2004 | Matsusaka et al. | ...... 251/129.15 |
| 7,014,168 B2 | * | 3/2006 | Shimura et al. | .......... 251/129.15 |
| 7,017,885 B2 | * | 3/2006 | Hirata et al. | ............. 251/129.15 |

FOREIGN PATENT DOCUMENTS

| | | |
|---|---|---|
| JP | 02000536 | 1/1990 |
| JP | 281008 | 6/1990 |
| JP | 348179 | 5/1991 |
| JP | 04151080 A | 5/1992 |
| JP | 08093948 A | 4/1996 |
| JP | 200018414 A | 1/2000 |
| JP | 2003314740 A | 11/2003 |
| JP | 2005054974 A | 3/2005 |

* cited by examiner

*Primary Examiner* — John Bastianelli
(74) *Attorney, Agent, or Firm* — Harness, Dickey & Pierce, PLC

(57) ABSTRACT

A solenoid valve wherein a valve sleeve and a solenoid case can easily be formed coaxially and manufacturing costs are reduced. The solenoid valve of the present invention comprises a valve sleeve 41 provided with a spool 60 axially movable in said valve sleeve 41, a solenoid case 21 mounted to a case mounting groove 43 formed near an axial rear end of said valve sleeve 41, and a molded body 23 mounted inside said solenoid case 21 and provided with a coil 22 in said molded body 23, and a case opening portion 25 formed at an axial end of said solenoid case 21 is engaged with said case mounting groove 43, and a concave portion 29 is formed at an axial end of said molded body 23 and said axial rear end of said valve sleeve 41 is fitted to said concave portion 29.

7 Claims, 12 Drawing Sheets

SOLENOID VALVE

TECHNICAL FIELD

The present invention relates to a solenoid valve preferably applied to hydraulic control, for example, for a hydraulic machinery and the like.

BACKGROUND ART

A conventional solenoid valve, for example, as shown in Japanese Patent Laid Open No. 2002-228036 (Patent Document 1), when a valve sleeve is fixed to a solenoid case, a flange shape convex portion is formed on the valve sleeve and a caulking piece provided on the solenoid case is caulked to the flange shape convex portion to fix it.

The solenoid valve having such constitution, there has been a disadvantage that, in order to form the flange shape convex portion on the valve sleeve, a diameter of the valve sleeve becomes larger and volume and weight of material of the valve sleeve also become larger. Also, since the valve sleeve and the solenoid case are fixed by caulking the caulking piece to the flange shape convex portion, there is risk that the valve sleeve rotates in a circumferential direction, and, that is, there is a disadvantage in fixing strength in a circumferential direction.

Therefore, when the flange portion is formed so as to fix to an electromagnetic portion as a conventional structure, since a diameter of aluminum material becomes larger, and, also in view of processing, since processing man-hours increase due to increase of portions to be cut, it has been disadvantageous in view of costs of manufacturing components. For this reason, in the valve sleeve with the flange portion made of aluminum, the valve sleeves is manufactured generally and commonly by forming an approximate shape by die casting, and then, completing it by cutting work.

Also, as shown in Japanese Patent Laid Open No. 2005-054974 (Patent Document 2), there is a solenoid valve wherein the valve sleeve and the solenoid case are fixed by using an engaging member.

In the solenoid valve having such constitution, since a number of components increases due to usage of the engaging member, there has been a disadvantage that manufacturing costs increase and assembling processes become complex.

Patent Document 1: Japanese Patent Laid Open No. 2002-228036

Patent Document 2: Japanese Patent Laid Open No. 2005-054974

DISCLOSURE OF THE INVENTION

Problems to be Solved by the Invention

The present invention has been made by considering above problems, a purpose thereof is to provide a solenoid valve wherein a valve sleeve and a solenoid case can easily be formed coaxially and manufacturing costs are reduced.

Means for Solving the Problem

In order to achieve the above purpose, a solenoid valve of the present invention is a solenoid valve comprising a valve sleeve provided with a spool axially movable in the valve sleeve, a solenoid case mounted to a case mounting groove formed near an axial rear end of the valve sleeve, and a molded body mounted inside the solenoid case and provided with a coil in the molded body, wherein a case opening portion formed at an axial end of the solenoid case is engaged with the case mounting groove, and a concave portion is formed at an axial end of the molded body and the axial rear end of the valve sleeve is fitted to the concave portion.

In the solenoid valve according to the present invention, the case opening portion formed at an axial end of the solenoid case is engaged with the case mounting groove formed near an axial rear end of the valve sleeve, so that the valve sleeve cannot be pulled out from the solenoid case. Also, the axial rear end of the valve sleeve is fitted to the concave portion formed at the axial end of the molded body in the solenoid case, so that coaxial properties of the valve sleeve, the solenoid case and the molded body are secured, and the valve sleeve is fixed in a rotating direction, and thus a rotating position is determined. Further, by having such constitution, the valve sleeve and the solenoid case are fixed without using any engaging member and the like, so that material costs can be reduced to manufacturing costs can be reduced.

Preferably, the case opening portion has a shape whose diameter in a first direction is longer than a diameter in a second direction, the axial rear end of the valve sleeve is formed as a shape which can be inserted into the case opening portion, and the case mounting groove is a groove that an edge portion of the case opening portion in the second direction is engaged with.

By forming the case opening portion and the axial rear end of the valve sleeve with such constitutions, and by forming the case mounting groove as a groove that the edge portion in the second direction at the case opening portion is to be engaged with, when the valve sleeve is rotated, for example, as 90° to the solenoid case, the edge portion in the second direction at the case opening portion is engaged with the case mounting groove, so that the valve sleeve cannot be pulled out from the solenoid case.

Preferably, a connector portion is formed on an outer circumference of the molded body, and the connector portion is fitted to a cutaway portion formed on the solenoid case. Also, preferably, the connector portion is formed integrally with the molded body.

By making such constitution, the molded body is caused not to rotate to the solenoid case.

Preferably, a center post is arranged inside the molded body, and a tip end of the center post is inserted inside a diameter bore formed in an axial direction in the valve sleeve.

By making such constitution, coaxial properties of the valve sleeve, the molded body and the solenoid case can be secured and backlash can be prevented.

Preferably, a lower plate is integrally formed with the molded body, and the tip end of the center post is inserted into an alignment bore formed on the lower plate.

By making such constitution, the coaxial properties of the valve sleeve, the molded body and the solenoid case can be secured more preferably and the backlash also can be prevented more preferably.

Also, in order to achieve the above purpose, a method for manufacturing a solenoid valve according to the present invention comprises steps of: inserting a case mounting groove formed near an axial rear end of a valve sleeve into a case opening portion formed at an axial end of a solenoid case; rotating the valve sleeve relatively to the solenoid case in a circumferential direction of the valve sleeve so as to be engaged with the case mounting groove to the case opening portion; and inserting a molded body inside the solenoid case so as to fit a concave portion of the molded body to an axial rear end of the valve sleeve.

By the method for manufacturing a solenoid valve having such steps, it is easy to assemble the valve sleeve and the solenoid case coaxially, and the manufacturing costs can be reduced.

Figure 2A:
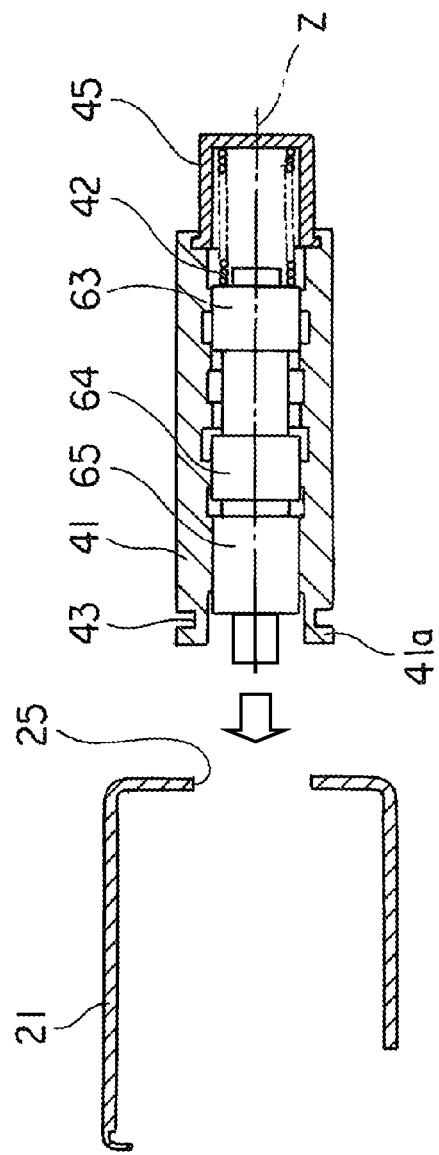
FIG. 2A is a first cross sectional view showing a step for mounting a solenoid case to a valve sleeve to manufacture the solenoid valve shown in FIG. 1.
Figure 2B:
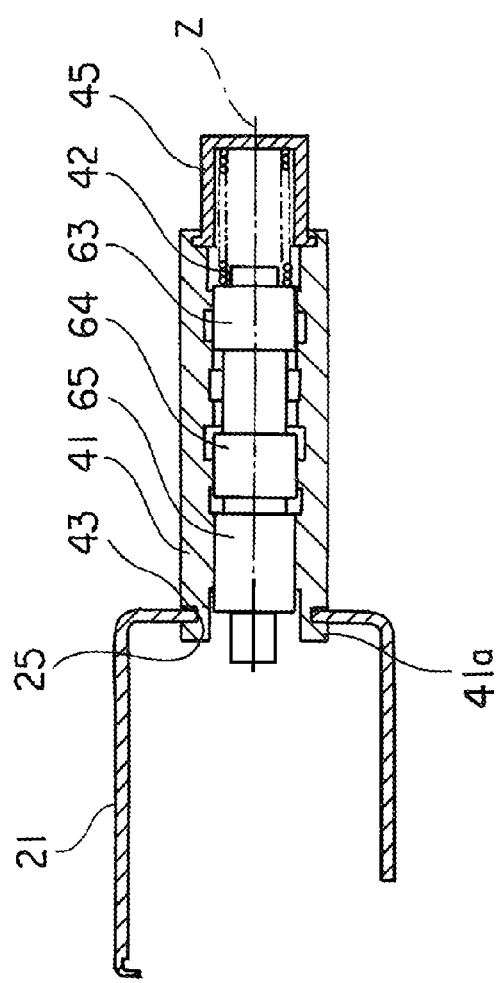
FIG. 2B is a second cross sectional view showing a step for mounting the solenoid case to the valve sleeve to manufacture the solenoid valve shown in FIG. 1.

is a main section enlarged view precisely showing a case opening portion at the section where the solenoid case is mounted to the valve sleeve shown in FIG. 2A and FIG. 2B.

Figure 3A:
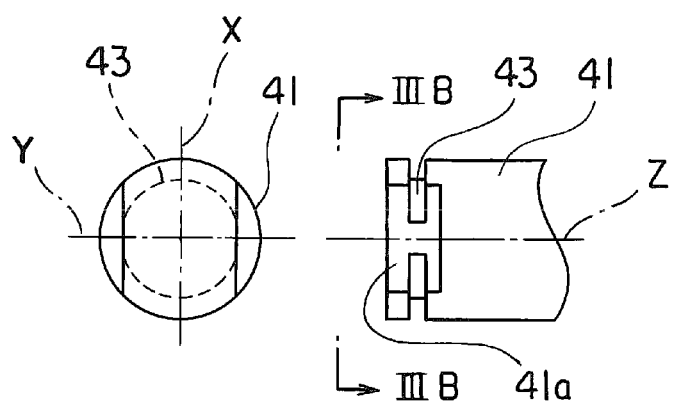
FIG. 3A is a main section enlarged view precisely showing a case mounting groove at a section where the solenoid case is mounted to the valve sleeve shown in FIG. 2A and FIG. 2B.
Figure 3B:
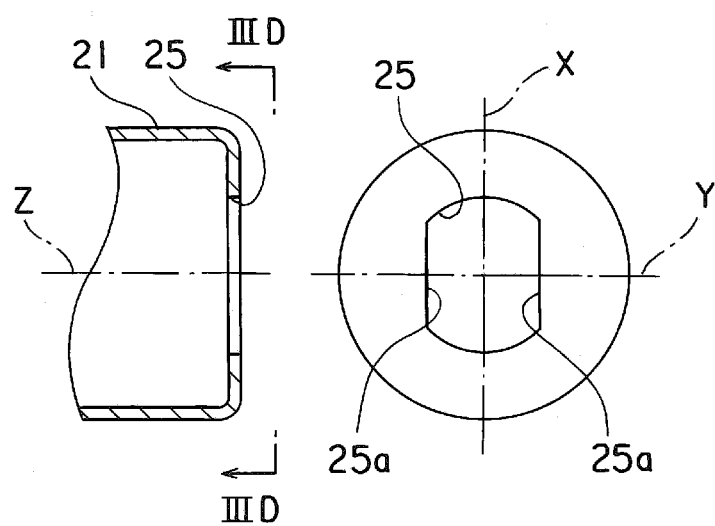
Figure 3C:
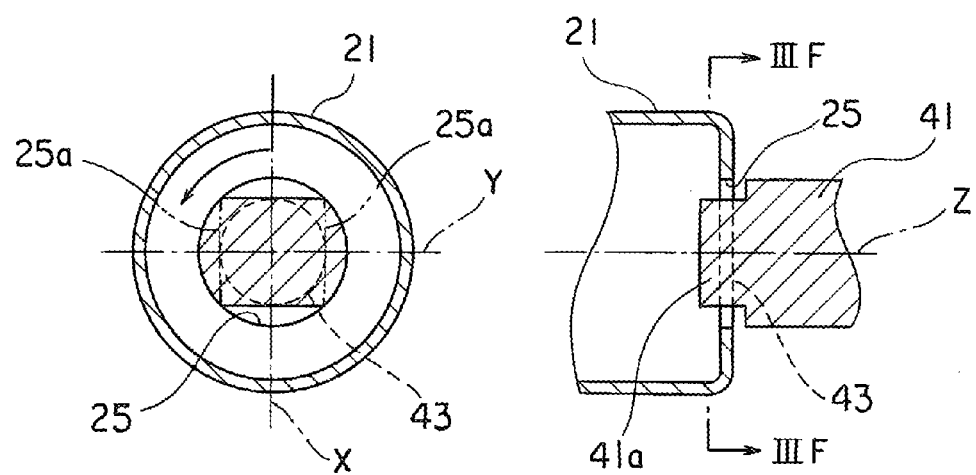

FIG. 3C is a main section enlarged view precisely showing a state that the case mounting groove and the case opening portion are engaged in the section where the solenoid case is mounted to the valve sleeve shown in FIG. 2A and FIG. 2B.

Figure 1:
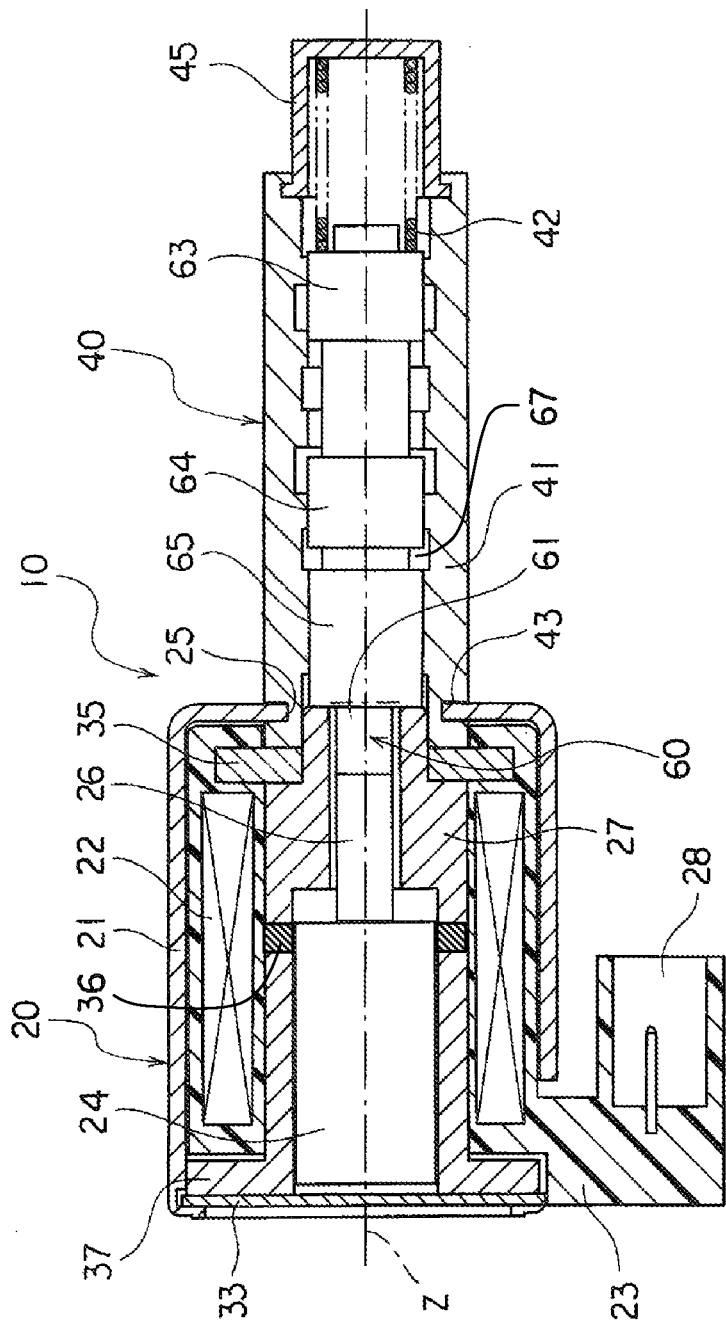
FIG. 1 is a cross sectional view of a solenoid valve according to an embodiment of the present invention.
Figure 4A:
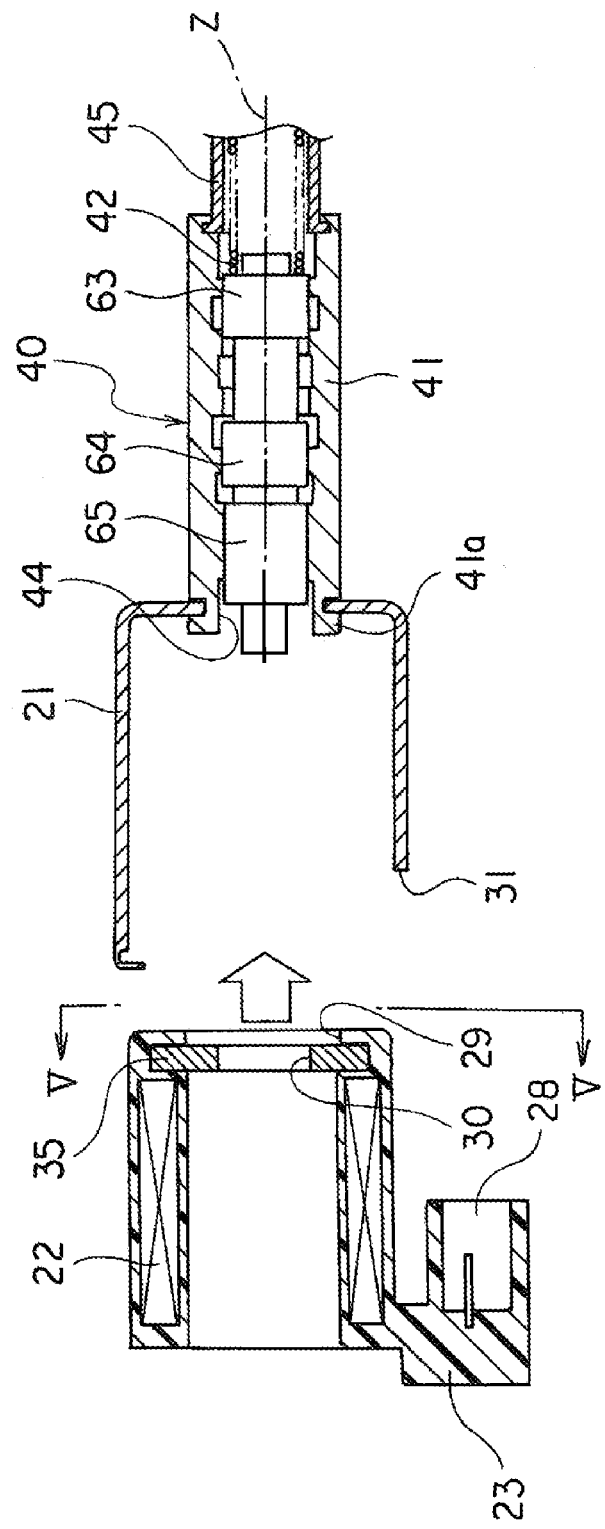

FIG. 4A is a first cross sectional view showing a step for mounting a molded body in the solenoid case to manufacture the solenoid valve shown in FIG. 1.

Figure 4B:
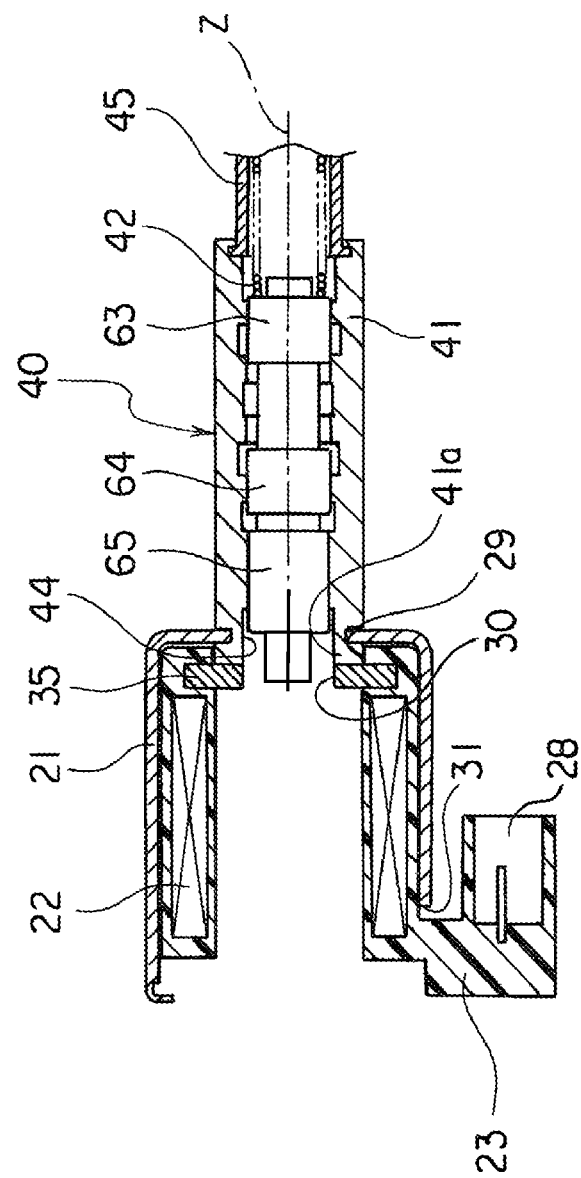

FIG. 4B is a second cross sectional view showing a step for mounting the molded body in the solenoid case to manufacture the solenoid valve shown in FIG. 1.

Figure 5:
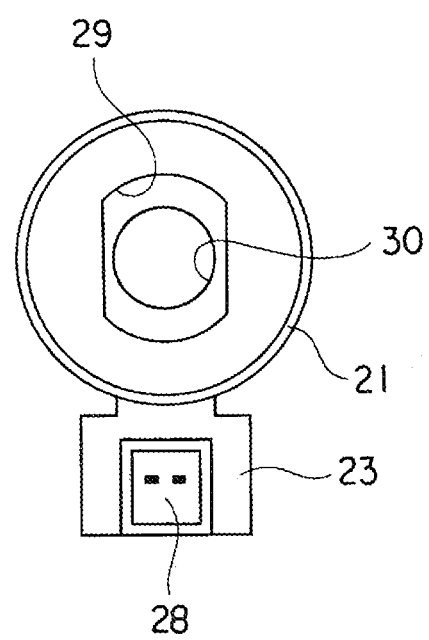

FIG. 5 is a plane view of the molded body shown in FIG. 4A and FIG. 4B.

Figure 6A:
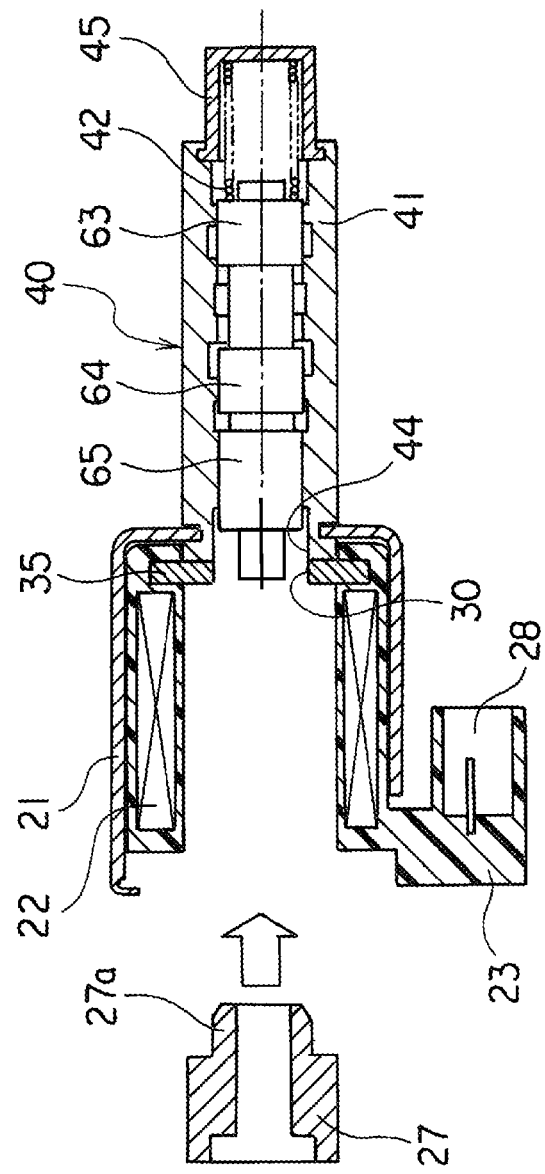

FIG. 6A is a first cross sectional view showing a step for mounting a center post to the molded body to manufacture the solenoid valve shown in FIG. 1.

Figure 6B:
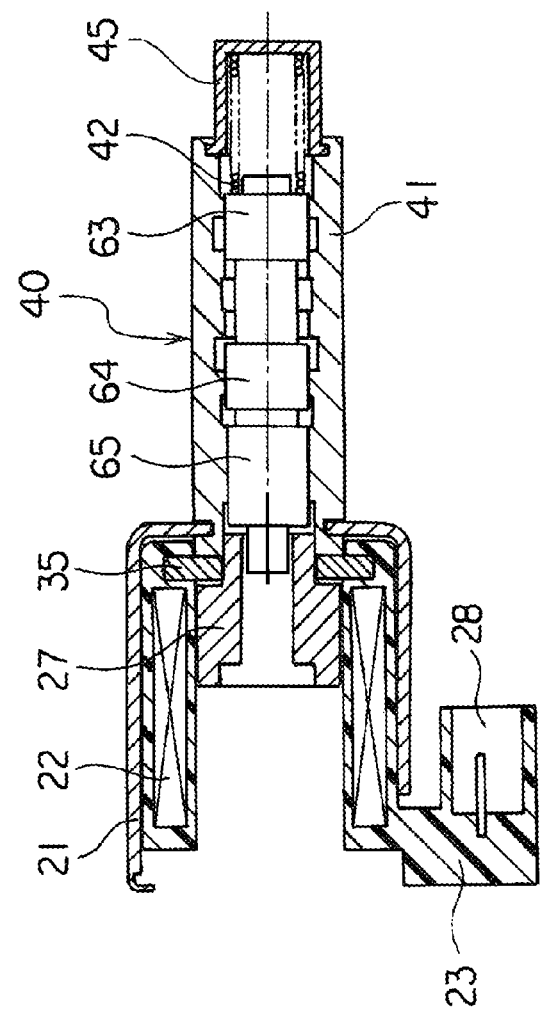

FIG. 6B is a second cross sectional view showing a step for mounting the center post to the molded body to manufacture the solenoid valve shown in FIG. 1.

Figure 7:
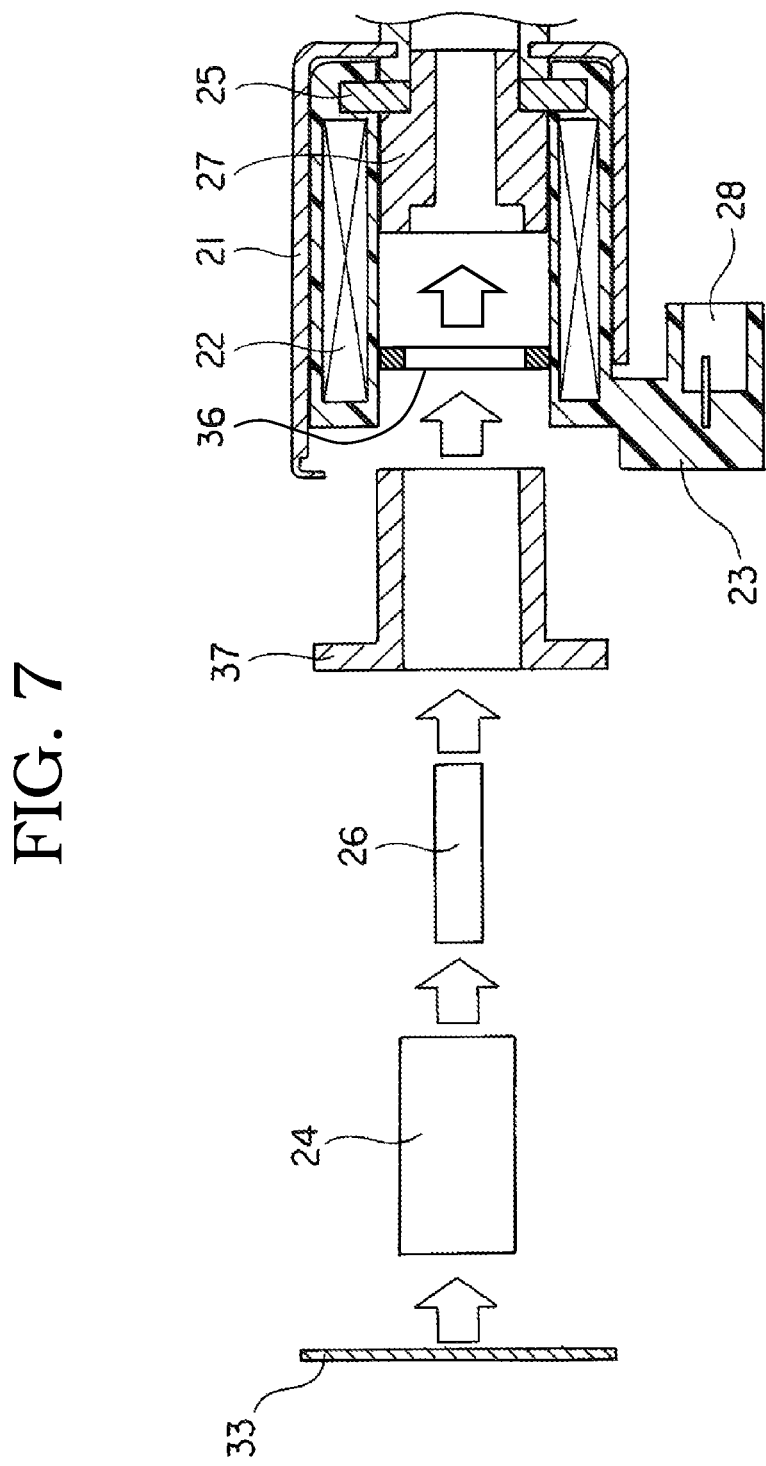

FIG. 7 is a cross sectional view showing a step for mounting a side ring, a spacer, a rod, a plunger and an end plate to the center post shown in FIG. 1.

BEST MODE FOR CARRYING THE INVENTION

Below, the present invention will be explained on the basis of embodiments shown in drawings.

FIG. 1 is a cross sectional view of a solenoid valve according to an embodiment of the present invention, FIG. 2A and FIG. 2B are cross sectional views showing a step for mounting a solenoid case to a valve sleeve shown in FIG. 1. FIG. 3A to FIG. 3C are main section enlarged views precisely showing a case mounting groove and a case opening portion shown in FIG. 2A and FIG. 2B, FIG. 4A and FIG. 4B are cross sectional views showing a step for mounting a molded body in the solenoid case shown in FIG. 1, FIG. 5 is a plane view of the molded body shown in FIG. 4A and FIG. 4B, FIG. 6A and FIG. 6B are cross sectional views showing a step for mounting a center post to the molded body shown in FIG. 1. FIG. 7 is a cross sectional view showing a step for mounting a rod, a plunger and an end plate to the center post of the solenoid valve shown in FIG. 1.

As shown in FIG. 1, a solenoid valve 10 according to the embodiment of the present invention is a spool type solenoid valve to control hydraulic pressure, for example, for an automatic transmission and the like for a vehicle.

The solenoid valve 10 comprises a solenoid portion (linear solenoid) 20 as an electric driving portion, a valve body 40 and a retainer 45. The solenoid portion 20 is mounted at one end (rear end) in an axial direction Z of the valve body 40, and the retainer is mounted at another end (tip end) in the axial direction Z of the valve body 40. The solenoid portion 20 comprises a molded body 23 provided with a coil 22 internally, a center post 27, a spacer 36, a side ring 37, a rod 26 and a plunger 24 in a solenoid case 21.

The coil 22 is integrally formed so as to be embedded inside the molded body 23 mounted on an inner circumferential side of the solenoid case 21, and control voltage is provided from a connector which projects toward an outside of the solenoid case 21 to the coil 22. The coil 22 generates a magnetic field with a desired strength and a desired direction and makes the plunger 24 generate driving force in the axial direction Z, so that the driving force is transmitted to the spool 60 via the rod 26 to becomes force for moving a spool 60 in an axial direction.

The side ring 37, the spacer 36 and the center post 27 are fixed on an inner circumferential side of the molded body 23. A plunger 24 is axially movably arranged on an inner circumference of the side rings 37, and the rod 26 is axially movably arranged on an inner circumference of the center post 27. The plunger 24 and the rod 26 are connected in a separable condition, a tip end of the rod 26 is in contact with a rear end of a spool shaft 61 of the spool 60. The spacer 36 is a component composed by non-magnetic material so as to form a magnetic gap.

At a tip end of the spool 60, a rear end of a spring 42 equipped inside the retainer 45 is coupled, and the spool 60 is constantly pressed to the rod 26 direction of the plunger 24 by elastic force of the spring 42. Note that, the retainer 45 is caulked to a tip end of the valve sleeve 41 of the valve body 40.

Although material of the valve sleeve 41 is not particularly limited, for example, aluminium, Fe, resin and the like are exemplified. Although material of the retainer 45 is not particularly limited, for example, Fe, stainless, resin and the like are exemplified.

On the valve sleeve 41, an inlet port, a control port, a drain port and a feedback port, although they are not shown in the drawings, are sequentially formed from the tip end side to the rear end side as openings through a circumferential wall of the valve sleeve 41.

The inlet port is a port that a controlling fluid (e.g., operating oil) supplied by a pump from a tank not shown in the drawings is flowed into. The control port is a port that the control fluid to a fluid requestor (load) such as the automatic transmission not shown in the drawings is supplied from. The feedback port and the control port communicate each other on the outside of the solenoid valve 10, a part of the control fluid flowed out from the control port flows into the feedback port.

The spool 60 is almost arranged in the center of the valve sleeve 41 in a movable condition in the axial direction Z, and consists of a spool shaft 61 and first to third lands 63 to 65 formed in cylindrical shapes.

The first to third lands 63 to 65 are integrally formed with the spool shaft 61 sequentially from the spring 42 side end portion of the spool 60 in the axial direction Z with predetermined spaces.

Outer diameters of the first to third lands 63 to 65 are larger than an outer diameter of the spool shaft 61. Also, though the outer diameters of the first land 63 and the second land 64 are almost same, the outer diameter of the third land 65 is smaller than the outer diameters of the first land 63 and the second land 64.

On the inside of the valve sleeve 41, a feedback chamber 67 is formed between the second land 64 and the third land 65. Since there is a difference between the outer diameter of the second land 64 and the outer diameter of the third land 65, areas on which the control fluid by the feedback acts to the spool 60 are different.

the feedback chamber 67 acting to the spool 60. Therefore, with respect to the control fluid flowed out from the control port, desired output pressure can be obtained by a balance among three forces which are a feedback force generated by the difference of the areas (difference of the outer diameters of the land 64 and the land 65), a spring force by the spring 42 and an electromagnetic force changed by amplitude of the electric current. For example, in a case of a type of control valve that the more the electric current is supplied to the solenoid portion 20, the less the output pressure becomes, the balance of the three forces can be shown by the following formula;

$$[\text{spring force}]=[\text{output pressure}(=\text{feedback force generated by outer diameters difference of lands})]+[\text{electromagnetic force}] \quad (1).$$

Also, in a case of a type of control valve that the less the electric current is supplied to the solenoid portion 20, the more the output pressure becomes, the balance of the three forces can be shown by the following formula;

$$[\text{spring force}]+[\text{output pressure}(=\text{feedback force generated by outer diameters difference of lands})]=[\text{electromagnetic force}] \quad (2).$$

One end of the spool 60 in the axial direction Z is in contact with the spring 42, and the other end of the spool 60 in the axial direction Z is in contact with the rod 24. Therefore, to the spool 60, other than a pressing force (feedback force) of the control fluid in the feedback chamber 67, a pressing force of the spring 42 (spring force) and a pressing force (electromagnetic force) due to the movement of the plunger 24 via the rod 24 are transmitted. The spool 60 slidingly moves in the valve sleeve 41 in the axial direction Z by these pressing forces.

In the solenoid valve 10 having such constitution, the spool 60 rests at a position where the pressing force (spring force) of the spring 42, the pressing force (electromagnetic force) of the plunger 24 which presses the spool 60 caused by magnetic suction force in a magnetic field originated by an electric current supplied to the coil 22, and the pressing force (feedback force) the spool 60 receives based on pressure of the control fluid in the feedback chamber 67 are balanced. Precisely, though these are statically balanced at the position to be balanced, practically, there are controlled by opening and closing the inlet port and the drain port frequently.

A position of the spool 60 in the valve sleeve 41 is controlled by the above mentioned force, and the inlet port and/or the drain port are opened or closed in desired states.

Also, an amount of the control fluid which flows from the inlet port 51 to the outlet port 52 is determined by an opening amount of the inlet port 51. The opening amount of the inlet port 51 is determined by a position of the spool 60 on the inside of the spool 41.

In the solenoid valve 10 configured like this, the coil 22 generates the magnetic field with desired strength and desired directions by supplying the electric current from a controlling circuit not shown in the drawings to the coil 22 of the solenoid portion 20, so that the plunger 24 is moved by the magnetic suction force of the magnetic field, and the spool 60 moves in the valve sleeve 41 of the valve body 40.

Therefore, in a case that an amount of the electric current supplied to the coil 22 increases and larger magnetic suction force is caused to act on the plunger 24, the spool 60 moves to the spring 42 side in the valve sleeve 41 of the valve body 40. When the spool 60 moves to the spring 42 side in the valve sleeve 41, an amount of the control fluid flowing from the control port to the drain port increases.

On the other hand, in a case that an amount of the electric current supplied to the coil 22 is caused as smaller and the magnetic suction force which acts on the plunger 24 is reduced, the spool 60 moves to the solenoid portion 20 side in the valve sleeve 41. When the spool 60 moves to the solenoid portion 20 side in the valve sleeve 41, an amount of the control fluid flowing from the inlet port to the control port.

Next, a method for manufacturing the solenoid valve 10 will be explained.

As shown in FIG. 2A, a case mounting groove 43 is formed near a rear end in the axial direction Z of the valve sleeve. Also, as shown in FIG. 3A, the case mounting groove 43 is a groove extending in the circumferential direction. The case mounting groove 43 is engaged with a case opening portion 25 formed at an end in the axial direction Z of the solenoid case 21 as shown in FIG. 2B.

As shown in FIG. 3B, at the end in the axial direction Z of the solenoid case 21, the case opening portion 25 with a shape whose diameter in a first direction X is longer than a diameter in a second direction Y. Also, as shown in FIG. 3A, a shape of the rear end 41a in the axial direction Z of the valve sleeve 41 is formed almost the same as the case opening portion 25. Therefore, as shown in FIG. 3C, the real end 41A of the valve sleeve can be inserted into the case opening portion 25. And then, by rotating the valve sleeve 41 relatively 90 degrees to the solenoid case 21, the edge portion 25a in the second direction in the case opening portion 25 is engaged with the case mounting groove 43, so that the valve sleeve 41 cannot be pulled out from the solenoid case 21.

Next, as shown in FIG. 4A, the molded body 23 is inserted inside the solenoid case 21. At the tip end in the axial direction Z of the molded body 23, a concave portion 29 is formed. As shown in FIG. 5, a shape of the concave portion 29 is almost the same as the rear end 41a of the valve sleeve. Also, a lower plate 35 is integrally formed inside the molded body 23, and an alignment bore 30 is formed at inside end portion in a diametrical direction on the lower plate. As shown in FIG. 4B, the rear end 41a of the valve sleeve 41 is fitted to the concave portion 29, so that coaxial properties of the valve sleeve 41, the solenoid case 21 and the molded body 23 are secured, and the valve sleeve is fixed in a rotating direction, and thus a rotating position is determined.

Also, a cutaway portion 31 is formed on the solenoid case 21. A connector 28 integrally formed on an outer circumference of the molded body 23 is fitted to the cutaway portion 31, so that the molded body 23 is caused not to rotate to the solenoid case 21.

After that, as shown in FIG. 6A and FIG. 6B, a center post 27 is arranged inside the molded body 23. The center post 27 comprises a projection portion 27a projecting in the axial direction Z, and the projection portion 27a is inserted into the insides of a diameter bore 44 and the alignment bore 30, so that the diameter bore 44 and the alignment bore 30 are caused in the condition that they have the same inner circumferential faces. As a result, the coaxial properties of the valve sleeve, the molded body and the solenoid case can be secured more efficiently and backlash can be prevented.

Finally, as shown in FIG. 7, a side ring 37, a spacer 36, a rod 26, a plunger 24 and an end plate 33 are mounted inside the molded body 23, so that the solenoid valve 10 of the present embodiment is manufactured.

The solenoid valve 10 of the present embodiment, by having above mentioned constitution, it is easy to assemble the valve sleeve 41 and the solenoid case 21 coaxially, and the manufacturing costs can be reduced.

Note that, the present invention is not limited to the above mentioned embodiment, it can be modified within a scope of the present invention.

The invention claimed is:

1. A method for manufacturing a solenoid valve, comprising steps of:
    inserting a case mounting groove formed near an axial rear end of a valve sleeve into a case opening portion formed at an axial end of a solenoid case;
    rotating said valve sleeve relatively to said solenoid case in a circumferential direction of said valve sleeve so as to be engaged with said case mounting groove to said case opening portion; and
    inserting a molded body inside said solenoid case so as to fit a concave portion formed at an axial end of said molded body to an axial rear end of said valve sleeve.

2. A solenoid valve comprising,
    a valve sleeve provided with a spool axially movable in said valve sleeve,
    a solenoid case mounted to a case mounting groove formed near an axial rear end of said valve sleeve, and
    a molded body mounted inside said solenoid case and provided with a coil in said molded body, wherein
    a case opening portion formed at an axial end of said solenoid case is engaged with said case mounting groove, and
    a concave portion is formed at an axial end of said molded body and said axial rear end of said valve sleeve is fitted to said concave portion.

3. The solenoid valve as set forth in claim 2, wherein said case opening portion has a shape whose diameter in a first direction is longer than a diameter in a second direction, said axial rear end of said valve sleeve is formed as a shape which can be inserted into said case opening portion, and said case mounting groove is a groove that an edge portion of said case opening portion in said second direction is engaged with.

4. The solenoid valve as set forth in claim 2, wherein a connector portion is formed on an outer circumference of said molded body, and said connector portion is fitted to a cutaway portion formed on said solenoid case.

5. The solenoid valve as set forth in claim 4, wherein said connector portion is formed integrally with said molded body.

6. The solenoid valve as set forth in claim 2, wherein a center post is arranged inside said molded body, and a tip end of said center post is inserted inside a diameter bore formed in an axial direction in said valve sleeve.

7. The solenoid valve as set forth in claim 6, wherein a lower plate is integrally formed with said molded body, and said tip end of said center post is inserted into an alignment bore formed on said lower plate.

* * * * *